(12) United States Patent
Haywood

(10) Patent No.: US 8,088,237 B2
(45) Date of Patent: Jan. 3, 2012

(54) METHOD FOR FORMING OR CURING POLYMER COMPOSITES

(75) Inventor: Alex Michael Haywood, Attadale (AU)

(73) Assignee: Industrial Composites Engineering Pty Ltd, Osborne Park, W.A. (AU)

( * ) Notice: Subject to any disclaimer, the term of this patent is extended or adjusted under 35 U.S.C. 154(b) by 507 days.

(21) Appl. No.: 11/635,626

(22) Filed: Dec. 8, 2006

(65) Prior Publication Data

US 2007/0113953 A1 May 24, 2007

Related U.S. Application Data

(63) Continuation-in-part of application No. PCT/AU2005/000829, filed on Jun. 9, 2005.

(30) Foreign Application Priority Data

Jun. 9, 2004 (AU) ................................ 2004903096

(51) Int. Cl.
*B29C 73/00* (2006.01)
*B32B 37/06* (2006.01)

(52) U.S. Cl. ......... 156/94; 156/98; 156/286; 156/307.1; 264/36.22; 264/258; 264/313; 264/552

(58) Field of Classification Search ............. 156/94, 156/98
See application file for complete search history.

(56) References Cited

U.S. PATENT DOCUMENTS

| | | | |
|---|---|---|---|
| 2,565,952 A | 8/1951 | Curran et al. | |
| 3,042,574 A * | 7/1962 | Hochberg | 156/286 |
| 3,117,055 A | 1/1964 | Parrish et al. | |
| 3,250,653 A | 5/1966 | Geist et al. | |
| 3,580,795 A | 5/1971 | Eichenlaub | |
| 3,661,683 A | 5/1972 | Engel et al. | |
| 3,946,099 A | 3/1976 | MacKenzie, Jr. | |
| 3,964,958 A | 6/1976 | Johnston | |
| 4,267,147 A * | 5/1981 | Pogoda et al. | 264/571 |
| 4,293,862 A * | 10/1981 | Beavers | 343/872 |
| 4,793,879 A * | 12/1988 | Mimbs | 156/98 |
| 4,983,341 A * | 1/1991 | Kromrey | 264/102 |
| 5,738,741 A * | 4/1998 | Crasto et al. | 156/71 |

FOREIGN PATENT DOCUMENTS

| | | |
|---|---|---|
| EP | 0478033 | 4/1992 |
| EP | 1199145 | 4/2002 |
| FR | 2691400 | 11/1993 |
| GB | 654289 | 6/1951 |
| GB | 1081911 | 6/1967 |
| WO | WO 01/64387 | 9/2001 |

OTHER PUBLICATIONS

Nov. 1, 1994, EPODOC/EPO Abstract for JP 06-305806 A 19941101.
Aug. 25, 2008, Written Opinion Singapore Application 200608562-5.
Jul. 14, 2008, Supplemental European Search Report EP 05746648.
Jun. 10, 2008, International Search Report PCT/AU2008/000444.

(Continued)

*Primary Examiner* — Philip Tucker
*Assistant Examiner* — William Bell
(74) *Attorney, Agent, or Firm* — Neifeld IP Law, P.C.

(57) ABSTRACT

In accordance with the present invention, there is provided a method for the forming or curing of polymer composites, the method including the step of:

forming or curing the polymer composite in the presence of water vapor at about atmospheric pressure.

17 Claims, 2 Drawing Sheets

OTHER PUBLICATIONS

Mar. 19, 2009, Applicant/Inventor characterization of reference FR 2691400-A1.
International Search Report PCT/AU2005/000829.
Intenational Preliminary Report on Patentablity PCT/AU2005/000829.
Patent Abstracts of Japan, JP 56-148521 A (Matsushita Electric Works Ltd) Nov. 18, 1981.
Patent Abstracts of Japan, JP 56-166020 A (Shin Kobe Electric Mach Co Ltd) Dec. 19, 1981.
Patent Abstracts of Japan, JP 57-051422 A (Mitsubishi Rayon Co Ltd) Mar. 26, 1982.
Patent Abstracts of Japan, JP 83-251207 A (Ashida Seisakusho KK) Oct. 18, 1988.
Patent Abstracts of Japan, JP 06-305808 A (Nippon Kayaku Co Ltd) Nov. 1, 1994.
Derwent abstract accession No. 2005-182279/19, WO 2005016819 A (Clion Ireland Ltd) Feb. 24, 2005.

* cited by examiner

METHOD FOR FORMING OR CURING POLYMER COMPOSITES

Cross Reference to Related Applications

This application is a continuation-in-part of PCT/AU2005/000829 filed Jun. 9, 2005, which claims priority to AU 2004903096 filed Jun. 9, 2004. The contents of PCT/AU2005/000829 filed Jun. 9, 2005 and AU 2004903096 filed Jun. 9, 2004 are incorporated by reference herein.

FIELD OF THE INVENTION

The present invention relates to a method and apparatus for the forming or curing of polymer composites. More particularly, the present invention relates to a method and apparatus for the forming or curing of polymer composites in the presence of a vapour.

BACKGROUND ART

The term polymer composite generally refers to materials produced by impregnating fibrous materials with resins that are used in a variety of industries, ranging from aerospace, motor sports, automotive, boating, civil construction and are generally formed in laminates or layers. The fibres used in such composites are varied and include carbon, aramid (Kevlar) and glass and the resins are generally selected from thermoplastic or thermosetting resins such as epoxy, cyanate, phenolic and the like.

The thermoset resin impregnated fibres are commonly soft, flexible, slightly tacky materials, comprising unidirectional fibres or woven cloth. The components of a polymer composite must be formed or cured under conditions of elevated temperature and pressure to compress the material and form the polymer composite.

In the case of a thermoplastic composite, the addition of heat serves to enable the flow of a thermoplastic resin which is solid at room temperature. The combination of pressure and temperature enables the molten resin to impregnate the fibres and form the thermoplastic polymer composite to the desired shape. The thermoplastic polymer composite then solidifies upon cooling to form the desired part.

Composite structures made from laminates and composite sandwich structures made from laminates and lightweight cores (honeycombs, foams, wood etc.) can suffer numerous defects as a direct result of the manufacturing process. Common problems include resin exothermic reactions, mould surface pitting, inhibited resin flow, internal porosity, voids, and a poor skin to core adhesion.

Voids and porosity are considered to be the most serious defects to deteriorate the mechanical properties of thermosetting polymer composites. Voids are the result of the expansion of volatiles in gaseous state during the cure cycle. Moisture is the major source of volatiles found in pre-impregnated thermosetting composite materials (pre-pregs). Pre-pregs readily absorb moisture from the surrounding atmosphere, with moisture content a function of the relative humidity, ambient temperature and pre-preg resin content. As the temperature of a thermosetting polymer composite component increases during the cure cycle, the vapour pressure from these volatiles increases. These pockets of gas are trapped in the polymer composite as the resin gels, forming spherical voids that can act as initiation sites for fatigue or fracture.

Porosity is a similar phenomenon to voids and is a result of air trapped between the plies of pre-preg during lay-up. These air pockets cannot be removed by simple vacuum consolidation and remain locked into the resin matrix during cure.

Current industry curing and forming methods involve ovens or autoclaves, which are pressurised ovens. Through the application of pressure, many of the above problems are minimised. However, some problems are not and several more are introduced as a direct result of the autoclaving process.

Thermosetting resin curing reactions are exothermic and the heat generated during curing creates serious problems (such as composite ignition) unless it is dissipated to the surroundings. The relatively low specific heat of the air or nitrogen, as used in autoclaves, ensures that little energy is absorbed by the gases during curing of the composite. Consequently, the autoclave temperature must be ramped at a slow rate, typically 1-3° C. per minute, up to anywhere between 100° C. and 200° C. Slow ramping ensures the temperature difference between the composite and the surrounding gas is enough to safely absorb the heat. The slow ramp rate requirement provides long cycle times, which can be inefficient for large volume part production. The slow ramp rates required are also a by-product of the poor thermal conductivity of gases. Raising the temperature too fast can create thermal gradients across the autoclave chamber if the heat sources are few in number and unevenly dispersed. This thermal gradient may produce thermal stresses in the polymer composite component as one end cures faster than the other.

Thermoplastic polymer composite forming methods require the input of heat energy to raise the temperature of the thermoplastic composite to a point at which the thermoplastic resin melts and flows. Typically, this is completed in an oven where the limitations imposed by the heat transfer rate of a gas or air may cause long ramping periods. Alternatively, the process is completed in an extruding machine which enables rapid ramp rates due to contact between the thermoplastic composite and metallic heating elements. However, the use of extrusion machines in the generation of thermoplastic polymer composites is extremely limited as the act of extruding, in which the resin is forced through a small heated opening, limits the quantity of fibre reinforcement that may be incorporated into the part. This quantity of reinforcement distinguishes between what is commonly regarded as a thermoplastic part and a thermoplastic polymer composite part.

A typical cure cycle in an autoclave involves a slow ramp up to the final cure temperature. As the temperature of the component increases, the resin viscosity is proportionately reduced. The reduced viscosity allows for increased gas flow, leading to the removal of entrained air and volatiles. This process continues until the cure reaction of the component begins to increase the viscosity faster than the increasing temperature can reduce it. Just before the reaction begins, the autoclave process holds the temperature briefly and increases the autoclave pressure to consolidate any remaining volatiles back into solution. Shortly after this, the reaction generates "gel" state in which the component becomes an amorphous semi-solid and no more gases can be removed. Optimisation of these fundamental process parameters allow for void levels to be reduced. This method is hampered however by the slow ramp rates required to avoid an exothermic reaction and the high pressures required to condense remaining volatiles. Furthermore, the volatiles that are condensed back into the composite during the pressure increase phase of the cycle detrimentally affect the polymer composite component by reducing the mechanical properties of the polymer component when exposed to elevated temperatures.

The autoclave process, in attempting to solve the problem of voids, introduces significant problems of its own. Apart from being capitally expensive, the high autoclave pressures can crush the core of a sandwich structure. The high pressures also require large pressure vessels to be manufactured, which are costly to purchase and maintain and require significant levels of infrastructure. Within the field of commercial aerospace production, the capital costs of constructing an autoclave and associated infrastructure are readily justifiable. Aerospace is an industry where low part count and exceedingly tight manufacturing tolerances are the norm. However, the fields of automotive, industrial and marine composite production have been seriously limited by the perceived need for autoclave based curing. Aside from the initial capital costs, the autoclave process requires extraordinarily expensive tooling systems, due to temperature gradients which are formed as a result of poor heat circulation, and high energy costs associated with heating the autoclave itself as well as the part within it. In many industries, the use of inert nitrogen gas also contributes to the costs associated with autoclave manufacture. The nitrogen is added to ensure that the composite remains in an inert environment should it self-ignite. In a non-aerospace environment, these high capital and running costs necessitate a high throughput as the value adding of the cure process is more difficult to justify to the customer. A high throughput is not feasible within the autoclave cure environment however as the slow ramp speed comprises between 30-70% of the overall cure time.

An alternate process involves immersion of the composite inside a bag into a bath of hot liquid to effect curing. This technique, in attempting to overcome problems associated with slow ramp-up rates, creates other problems.

For curing large components, heavy structures are needed to contain the amount of liquid needed for complete submersion. Further, heavy equipment is needed to maintain the component immersed during the cure cycle.

Further still, this method is problematic at temperatures over 100° C. The addition of boiling suppressants to water only increases the boiling point to about 107° C. So, for components requiring higher curing temperatures, oil baths are used. The oil is consumable as it adheres to the vacuum bag covering the components on removal from the bath and is expensive on a component by component basis. In addition, very few oils can be exposed to atmosphere at temperatures as high as 177° C. without oxidising, this oxidation generating corrosive elements that can damage both the vacuum bag and the equipment.

Further still, should the vacuum bag suffer a leak, the heating fluid will enter the vacuum bag, potentially damaging the component.

In the field of civil engineering, infrastructure construction and repair, the quality requirements of polymer composite structures are similar to the aerospace industry. By contrast however the size of structures and the necessity for on-site repair and manufacture have excluded the use of aerospace quality composite materials. Recently, significant numbers of repairs to bridges, buildings, dams and other concrete and steel constructions have been undertaken worldwide. These repairs have focussed on the use of wet layup or secondarily bonded carbon fibre/epoxy composite systems. These wet layup or secondarily bonded systems produce poor quality final bond strengths and unreliable repairs. In addition, the use of ambient curing epoxies generates materials with reduced properties as the structures warm up on a hot day.

The reason the infrastructure and civil engineering markets are forced to utilise poor quality polymer composites is that autoclaves and ovens cannot be taken to site or used in limited access areas. Further, the use of autoclaves on the side of a bridge is impossible due to the inability to create a pressurised seal in such a situation. This limitation in portability has prevented the use of high quality composite materials in infrastructure repair. Similarly the civil construction industry is unable to utilise polymer composite components to create large structures due to its inability to access ovens or autoclaves of sufficient size or fluid containing tanks of sufficient size. Further, the transport of large structures to site would be extremely difficult were they able to access the appropriate curing facilities. As noted above all of the methods of the prior art require the use of large and expensive equipment and are not amenable to portability.

There is a need to provide a method and apparatus for the curing of composites that provides a useful alternative to those already known in the industry.

The preceding discussion of the background to the invention is intended to facilitate an understanding of the present invention. However, it should be appreciated that the discussion is not an acknowledgement or admission that any of the material referred to was part of the common general knowledge in Australia as at the priority date of the application.

DISCLOSURE OF THE INVENTION

In accordance with the present invention, there is provided a method for the forming or curing of polymer composites, the method including the step of:

forming or curing the polymer composite in the presence of water vapour at about atmospheric pressure.

The water vapour may be provided in the form of dry steam (steam which does not contain water held in suspension mechanically), wet steam (steam which contains water held in suspension), saturated steam (steam at the temperature of the boiling point which corresponds to its pressure) or superheated steam (steam heated to a temperature higher than the boiling point corresponding to its pressure.

In one form of the invention, the steam may be diverted to a separator after being created to remove liquid water and produce dry steam.

During the time when the composite is below 100° C. (at atmospheric pressure), water condenses on the composite imparting large quantities of energy which enables a high ramp rate. Without being limited by theory, it is believed that the latent heat of condensation of water enables quicker ramp up times to be achieved. This permits the uncured composite to be exposed to cure temperatures immediately without the need for slow ramp-up rates. The latent heat of condensation is not available with gases such as nitrogen and air.

The use of water vapour enables the temperature of the composite to be rapidly altered either due to the initial introduction of water vapour or the rapid removal of water vapour.

Further, the use of water vapour negates the need for heavy lifting equipment and reduces buoyancy problems known in the prior art.

Without being limited by theory, it is believed that the method of the present invention decreases the incidence of thermal stresses developing on the component due to differing cure rates on different parts of the component.

In one form of the invention, the method of the present invention includes the further steps of:

placing the composite in a chamber; and filling the chamber with water vapour.

The method of the present invention enables the temperature of the chamber to be rapidly increased or decreased by injecting or expanding heated vapour from a separate chamber or replacing the heated vapour with cooled vapour or air. These properties may be employed when the cure cycle requires a sharp temperature 'spike' to help eliminate volatiles and hence voids, or a rapid temperature reduction, to aid in controlling exotherms.

The chamber may be a closed chamber or an open chamber.

In an alternate form of the invention, the method of the present invention includes the further step of:

placing the composite in a vapour filled chamber.

Where the chamber is an open chamber, the chamber should enclose the steam to the extent that the surface of the composite is exposed to the steam. The chamber may be provided in the form of a conduit, open at both ends thereof. The composite may be placed in the conduit or passed through the conduit.

Preferably, the composite is suspended within the chamber.

In one form of the invention, the step of filling the chamber with vapour includes the step of:

pumping the vapour into the chamber.

Where the vapour is pumped into the chamber, the vapour is preferably injected into the chamber.

In a second form of the invention, the step of filling the chamber with vapour includes the step of:

expansion of the vapour into the chamber during vapourisation.

The step of vapourisation may occur within the chamber or in a second chamber.

Preferably, the method of the present invention includes the further step of:

laying up at least one ply of polymer composite on a mould, prior to the step of forming or curing the polymer composite.

Preferably, the method of the present invention includes the further steps of:

covering the composite with a substantially air tight layer of material; and reducing the pressure inside said layer of material.

Preferably, the substantially air tight layer of material is flexible and able to conform to the shape of the composite and the mould where it is provided. The substantially air tight layer of material may be prepared from plastic, silicone or a fluroelastomeric material. Preferably, the substantially air tight layer of material is a plastic bag. The substantially air tight layer of material may be provided with a valve through which a vacuum is applied.

In accordance with the present invention, there is provided a method for the forming or curing of polymer composites, the method including the steps of:

placing at least one ply of polymer composite in a chamber;

filling the chamber with heated water vapour at about atmospheric pressure to heat the composite; and;

thereby forming or curing the polymer composite.

The water vapour is preferably provided at a temperature of at least 80° C. More preferably, the water vapour is provided at a temperature of at least 100° C.

In accordance with a second aspect of the present invention, there is provided a method for the repair of a component having a damaged portion, the method including the steps of:

applying uncured composite to at least the damaged part of the component;

applying water vapour at about atmospheric pressure to the uncured composite; and thereby forming or curing the polymer composite.

Advantageously, the method of the present invention does not require the use of rigid seals about the uncured composition to maintain high pressure during the curing cycle.

In one form of the invention, the component is provided in the form of a polymer composite. The method may be used to repair a damaged portion of a plane, boat, or other components comprising a polymer composite, by laying uncured composite over the damaged area and passing steam over the composite.

In an alternate form of the invention, the component is provided in the form of a building, structure, vessel, vehicle, aircraft or watercraft or any portion thereof including bridge beams, crane booms and aircraft wings. The component may comprise materials other than polymer composites but said materials should have the ability to be bonded by the composite materials and maintain their integrity at the prescribed elevated cure temperature during the cure cycle.

Preferably, the method includes the further step of:

covering the component with a substantially air tight layer of material; and reducing the pressure inside said layer of material.

More preferably, the method includes the further step of:

constructing an insulated chamber around the uncured composite.

In accordance with the present invention, there is provided a method for the repair of a component having a damaged portion, the method including the steps of:

applying uncured composite to at least the damaged part of the component;

covering the composite with a substantially air tight layer of material;

constructing an insulated chamber around the uncured composite and the substantially air tight layer of material;

reducing the pressure inside said layer of material;

applying water vapour at about atmospheric pressure to the composite; and thereby forming or curing the polymer composite.

Preferably, the method includes the further step of:

mechanically removing loose material from the surface of the component.

Preferably, the method includes the further step of:

applying a gap filling compound to any apertures in the component to reduce the likelihood of air ingress.

Preferably, the method includes the further step of:

applying an adhesive film to the component to increase bonding between the component and the composite.

In one form of the invention, the adhesive material is provided in the form of an epoxy adhesive.

Preferably, the method includes the further step of:

applying a non-stick release film on the composite.

Preferably, the method includes the further step of:

applying a breather layer around the composite to provide a path for air evacuation.

In accordance with the present invention, there is provided a method for the repair of a component having a damaged portion, the method including the steps of:

applying an adhesive film to the component to increase bonding between the component and the composite;

applying uncured composite to at least the damaged part of the component;

applying a non-stick release film on the composite;

applying a breather layer around the composite to provide a path for air evacuation;

covering the composite with a substantially air tight layer of material;

constructing an insulated chamber around the piece of uncured composite;

reducing the pressure inside said layer of material; and applying water vapour at about atmospheric pressure to the uncured composite, thereby forming or curing the composite.

In accordance with a third aspect of the present invention, there is provided an apparatus for performing a method according to the first or second aspects of the invention.

BRIEF DESCRIPTION OF THE DRAWINGS

The present invention will now be described, by way of example only, with reference to three embodiments thereof, and the accompanying drawings, in which:—

BEST MODE(S) FOR CARRYING OUT THE INVENTION

Figure 1:
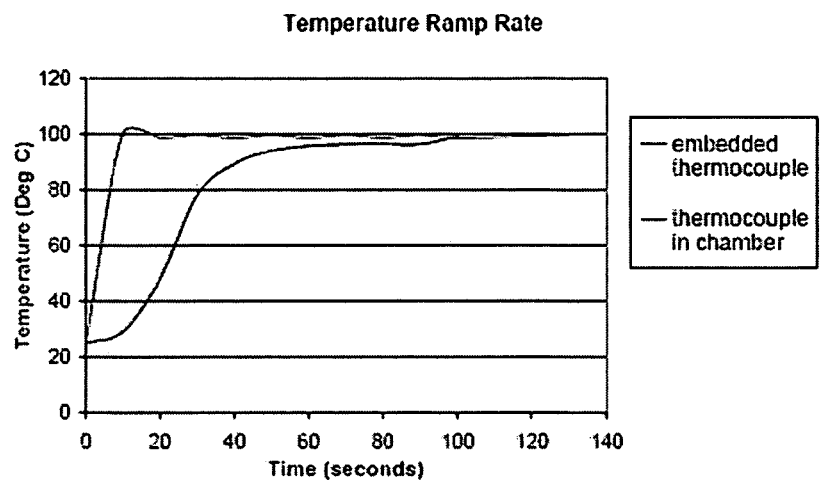
FIG. 1 is a plot of temperature versus time for a composite cured in accordance with a first embodiment of the present invention.

Those skilled in the art will appreciate that the invention described herein is amenable to variations and modifications other than those specifically described. It is to be understood that the invention includes all such variations and modifications. The invention also includes all of the steps, features, compositions and compounds referred to or indicated in the specification, individually or collectively and any and all combinations or any two or more of the steps or features.

By way of example, the method of the present invention is described in the context of the curing of composites in the presence of water vapour, although such should not be seen as limiting the generality of the foregoing description.

The method of the present invention involves the placing of a pre-preg on a mould in a bag under vacuum, into a chamber filled with steam. The vacuum bag pulls the uncured composite pre-preg onto the mould surface whilst preventing the steam from being absorbed by the pre-preg.

To ensure complete cure, thermocouples may be embedded between the pre-preg plies to monitor whether the uncured composite has been exposed to cure temperatures for the time specified by the pre-preg manufacturer. Alternatively, for applications where the development of Glass transition temperatures are not as important, thermocouple data may be used to indicate when exothermic reaction is complete, indicating a majority of polymer sites have reacted and composite is sufficiently cured.

Using the method of the present invention, large components such as vehicles, aircraft, watercraft and structural components may be placed into the chamber, the chamber closed, and the steam injected or expanded. For curing in liquid baths, the component must be placed in the bath with the liquid already in the bath, which requires heavy lifting equipment for both placement and holding down the buoyant component during cure.

For large production items such as bridge and building beams, aircraft wings, architectural features and crane booms, a continuous conveyor may be used as the steam chamber does not need to be rigidly sealed as with a liquid bath or autoclave, which can allow for more rapid part production than with liquid bath curing, where the part is lowered into the liquid with hydraulic equipment.

With liquid bath curing, the component may be unable to be placed in the chamber and then the hot liquid introduced, as the lower portions of the component would cure first, causing thermal stresses in the part to develop during cure.

With autoclave or liquid bath curing, the sealed vessel cannot be applied to a large structure such as a building or bridge to provide heat for curing as sufficient seal could not be generated practically nor economically. Further the costs for mobilising the autoclave or bath to site would be prohibitive.

Where the component is placed in the chamber at room temperature and atmospheric pressure and steam is injected into the chamber, there will be a period of time at which the part is below 100° C. The temperature difference between the component and the surrounding steam will cause some of the steam to condense on the component. As the component temperature passes 100° C., the moisture on the component will vapourise to steam.

Without being limited by theory, it is believed that two processes are occurring during the whole cure cycle, the first being the condensation of water vapour onto the component whilst the component is at less than 100° C. As the steam condenses onto the component, the latent heat energy stored in the steam is released and aids in bringing the component to temperature in as rapid a time as possible. The condensed water, with a specific heat of 4.19 kJ/kgK, combined with the surrounding steam (approximately 1.93 kJ/kgK and dependant on quality of steam) ensures any excess heat created through the resins exothermic reaction is rapidly absorbed out of the composite part.

As the component temperature nears 100° C., there may be a pause in the heating as the condensed moisture on the component is revapourised by incoming superheated steam. This second heating step is caused by the heat transfer coefficient of steam.

Vapour laden steam has a higher thermal conductivity than air and nitrogen, as such, thermal gradients are less of an issue than with autoclave curing. This ability to bring the component rapidly to temperature and regulate is believed to play an important role in the elimination of voids.

Moisture absorption on uncured composites is a major cause of void formation and even though vacuum bags are used in the liquid bath techniques of the prior art, moisture can still contact the component through small holes in the bag etc, as the nature of vacuum bagging itself, is to suck everything through the vacuum fitting. Using the method of the present invention, the component is only in contact with small concentrations of moisture for the period in which it is below 100° C., which may be only a few minutes. This would not be sufficient time for significant moisture to penetrate the vacuum bag layer. Above 100° C., the steam is not condensing on the component.

The following Examples serve to more fully describe the manner of using the above-described invention, as well as to set forth the best modes contemplated for carrying out various aspects of the invention. It is understood that these Examples in no way serve to limit the true scope of this invention, but rather are presented for illustrative purposes.

EXAMPLE 1

A shallow pool of water in a 200 L tank containing two 2.5 kW heating elements was heated to the point of vaporisation. Composite test pieces comprised of Toray G83c plain weave carbon fibre pre-preg, covered with Wrightlon 5200 release film and Airweave N10 breather/bleeder all contained in a Wrightlon 6400 vacuum bag at 5 kPa absolute pressure were immersed in the enclosed chamber of steam and left to cure for the required period as stated by the pre-preg manufacturer. Thermocouples were inserted between the plies at each end of the test piece during lay-up to give a reading of the temperature profile across the composite part during cure, and the time taken reach cure temperature, data was recorded by hand and the results are illustrated in FIG. 1.

Both thermocouples showed very similar results indicating a good temperature profile across the enclosed chamber. The composite part reached cure temperature approximately 160 seconds after vapour immersion, indicating the ability of the steam to rapidly bring the component to cure temperature. The constant temperature profile after this period indicated the ability of the process to regulate the temperature of the composite and absorb the heat produced as the resin exotherms.

EXAMPLE 2

A shallow pool of water in a 2700 L chamber (insulated tank of dimensions 2.4 m long by 1.2 m wide and 1.2 m deep) containing six 2.5 kW heating elements evenly distributed around the base of the tank was heated to the point of vaporisation. A full composite car chassis comprised of Ayres aluminium honeycomb core materials and Toray G83c plain weave and uniaxial carbon fibre pre-preg, covered with Wrightlon 5200 release film and Airweave N10 breather/bleeder all contained in a Wrightlon 6400 vacuum bag at 5 kPa absolute pressure was suspended within the chamber by means of a lifting jig and left to cure for the required period as stated by the pre-preg manufacturer. The curing was successful and the chassis was used on a 2003 Formula SAE Racing Car.

EXAMPLE 3

Figure 2:
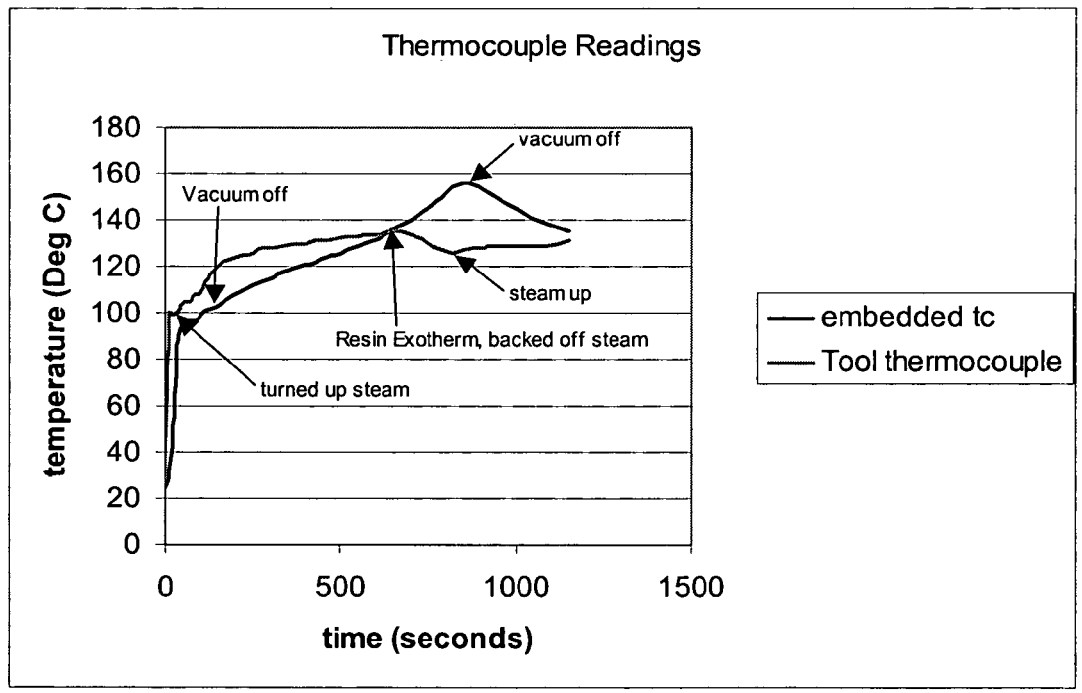
FIG. 2 is a plot of temperature versus time for both the component and the incoming steam for a composite cured in accordance with a first embodiment of the present invention.

The 200 L tank used in Example 1 was used as a chamber in which superheated steam was injected at atmospheric pressure. Test pieces comprised of Toray 2510 plain weave carbon fibre pre-preg, covered with Wrightlon 5200 release film and Airweave N10 breather/bleeder all contained in a Wrightlon 6400 vacuum bag at 2 kPa absolute pressure were placed in the chamber and subjected to superheated steam at 180° C. The test piece underwent exothermic reaction as it cured but the surrounding steam absorbed the excess heat produced, achieving gelation within 90 s and successfully curing the composite in under 20 min. The plot of temperature versus time for both the component and the incoming steam are shown in FIG. 2.

EXAMPLE 4

A piece of cut timber representative of a wooden bridge beam, pylon or structural member featuring weathering and rot damage was treated to remove loose material from the surface. To ensure good bonding between the timber beam and the composite, the timber may be consecutively air blasted and sanded to generate a keyed surface. A high temperature, fast curing Epoxy paste was applied to construct 'vacuum rings' around two portions of the timber. The paste was prepared from mixing a high temperature epoxy resin with portions of Colloidal Silica and Q-cell microspheres to give a thick paste that was sandable once set. The vacuum rings were left to cure overnight before lightly sanding to provide a smooth surface.

A flexible, fast curing, gap filling, compound was applied with a caulking gun to any cracks in the timber to reduce propagation of air along the cracks during vacuum consolidation. Vacuum consolidation is an important step in the process during cure as it ensures a good adhesive bond between the wood and the prepreg. If air is allowed to get between the prepreg and the wood during cure, the adhesive bond may be compromised. A high temperature epoxy adhesive film (Cytec FM73M-OST) was wrapped around the timber. The adhesive film provided the necessary amount of epoxy to ensure a strong, tough and durable bond between the timber and prepreg material. The film is formulated to match the thermal properties of the prepreg it is bonding to, so the choice of adhesive film used will depend largely on the choice of prepreg.

The timber was wrapped in uncured composite comprised of Toray G83c plain weave carbon fibre pre-preg. Vacuum bag sealant tape was applied around the vacuum rings to provide an airtight seal between the vacuum bag and the timber. The pre-preg was covered in non-stick release film (Wrightlon 5200 release film) to ensure the resin did not stick to the breather fabric during cure. Breather (Airweave N10 breather/bleeder) was wrapped around the composite to provide a path for the air to be evacuated during vacuum consolidation. The timber and the composite section were wrapped in an airtight vacuum bagging film (Wrightlon 6400 vacuum bagging film) and an evacuation port was attached and a vacuum (5 kPa absolute pressure) applied to the bag.

A flat piece of insulated fabric in the form of a thick woven fire proof polyester referred to as the 'steam bag' was loosely wrapped over the timber such that the ends of the timber protruded past the ends of the bag. Where the fabric was wrapped over the timber it was joined to itself using a hook and loop system such as Velcro® to form a flexible cylinder encasing the composite wrapped timber. At the ends of the flexible cylinder where the timber exited the cylinder, the cylinder was drawn tight around the timber using sewn in cinches to form a loosely sealed bag. The bag was filled with steam for approximately 2 hours to cure the composite and to bond it to the timber.

Figure 3:
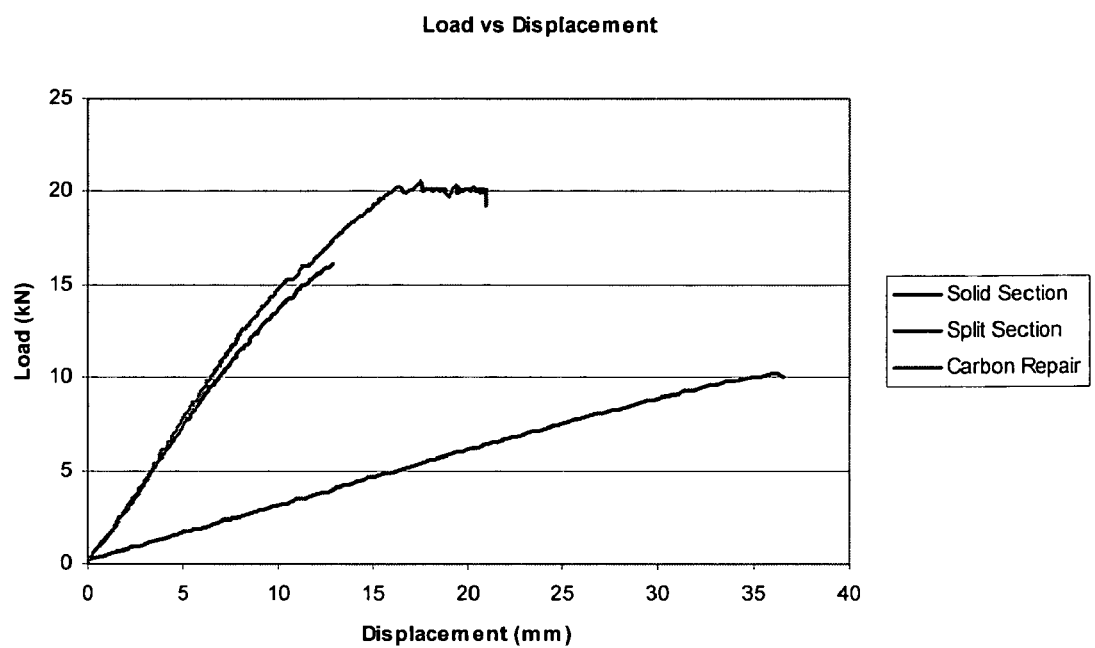
FIG. 3 is a comparative plot of load vs deflection for a test programme in which a composite cured in accordance with a first embodiment of the present invention and described n Example 4.
Figure 4:
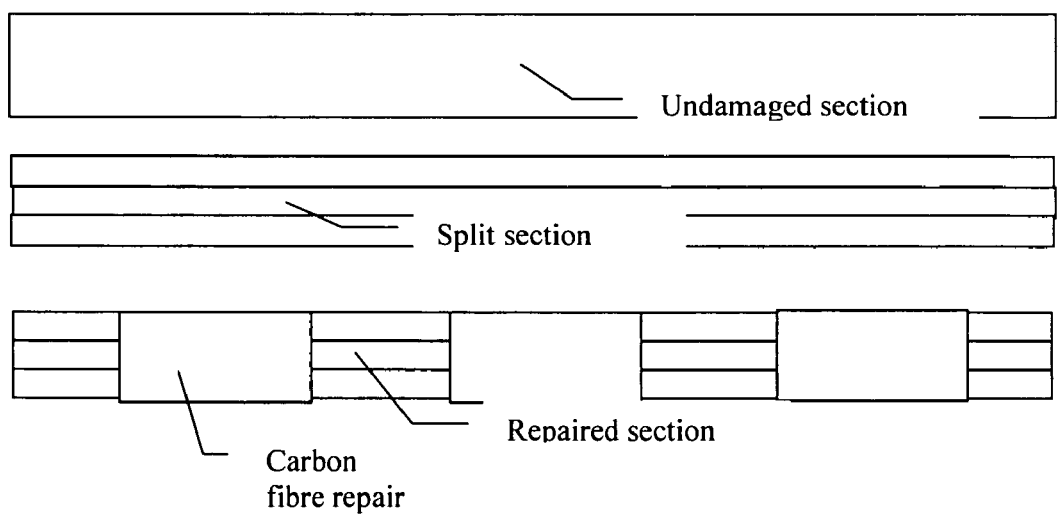
FIG. 4 is a schematic of the layout of various pieces of timber used and described in Example 4.

The timber was 3 point bend tested over a span of 1.2 m using an Instron 8501 with a 100 kN load cell and found to have twice the strength of a similar undamaged piece of timber. A comparative plot of load vs deflection for the test programme can be found in FIG. 3 where the solid section refers to an undamaged piece of timber, the split section refers to a piece of timber that was cut longitudinally to produce three equal sized pieces and carbon repair refers to the split section being repaired as described in the example. A schematic layout of the 3 pieces of timber can be seen in FIG. 4.

EXAMPLE 5

A open wheeled racing car chassis comprised of Ayres aluminium honeycomb core materials and Toray G83c plain weave and uniaxial carbon fibre pre-preg, was damaged in an area inside the engine bay. The damage required the removal of broken fibres and unbonded areas of carbon fibre. Following the removal of the damaged portion, the area was cleaned and new uncured Toray G83c plain weave and uniaxial carbon fibre pre-preg was placed over the damaged area. The area was covered with Wrightlon 5200 release film and Airweave N10 breather/bleeder and enclosed in a Wrightlon 6400 vacuum bag at 5 kPa absolute pressure. This area was then covered using a section of medium density polyurethane foam in which a hollow space had been formed by carving to provide a large air filled void between the foam and the bag. On the opposite surface to the area under repair, a fan was positioned to maintain a constant cooling air flow over the undamaged sections of chassis. The void within the foam was filled with steam for a period of approximately 4 hours causing curing of the composite. The effect of the curing was such that the chassis was repaired to a strength sufficient for its intended design loads.

EXAMPLE 6

Six pieces of concrete measuring 150×150×30 mm were covered with an uncured composite material comprised of SP Systems SE84LV plain weave carbon fibre pre-preg, covered with Wrightlon 5200 release film and Airweave N10 breather/bleeder and encased in a Wrightlon 6400 vacuum bag at 2 kPa absolute pressure. The bag was placed in a chamber to which steam was introduced.

After a period of 2 hours, the composite was cured and the concrete samples were subject to tensile dolly pull off tests which displayed that the bond between the composite and the concrete was greater than the tensile strength of the concrete.

EXAMPLE 7

A hollow aluminium beam of nominal dimensions 3 m×150 mm×50 mm was covered on 3 sides with uncured composite comprised of Toray G83c plain weave carbon fibre pre-preg, covered with Wrightlon 5200 release film and Airweave N10 breather/bleeder. The uncured composite was encased in a bag prepared from Wrightlon 6400 vacuum bagging film which was sealed and subjected to vacuum to generate 5 kPa absolute pressure. Steam was introduced to the centre of the hollow aluminium beam and the aluminium beam and composite were heated by the steam for a period of 2 hours such that the composite was cured. The composite was removed from outside of the aluminium beam to form a cured composite channel.

Modifications and variations such as would be apparent to a skilled addressee are deemed to be within the scope of the present invention.

The claims defining the invention are as follows:

1. A method of forming or curing a thermosetting polymer composite comprising:
   laying an uncured thermosetting polymer composite on a support;
   forming an airtight barrier about the uncured composite to define a region between the composite and the airtight barrier;
   applying vacuum to conform the airtight barrier to a shape of the composite and underlying support;
   introducing water vapour into an open or closed chamber about the airtight barrier, which chamber includes a flexible material arranged loosely over the airtight barrier and constituted by mutually facing surfaces of the flexible material and the air tight barrier;
   whereby the polymer composite is substantially cured by condensing water vapour in said chamber directly on the airtight barrier, and heating the composite through said barrier while the flexible material remains loosely arranged during the curing step.

2. The method according to claim 1 wherein the water vapour is selected from the group consisting of dry steam, wet steam, saturated steam and super heated steam.

3. The method according to claim 1 wherein the water vapour is provided at a temperature of at least 80° C.

4. The method according to claim 1 wherein the water vapour is confined by the chamber to surround said composite when the water vapour is in or passing through the chamber.

5. The method according to claim 4 further comprising expanding the water vapour when being passed into the chamber.

6. The method according to claim 1 further comprising:
   either (a) evaporating water within the chamber to produce the water vapour or (b) evaporating water outside of the chamber to produce the water vapour and passing the water vapour into the chamber.

7. The method according to claim 1, wherein forming the chamber comprises loosely wrapping a flexible material about the uncured polymer composite.

8. The method according to claim 1, comprising providing the flexible material as a layer of insulating material wherein the chamber is formed as an insulated chamber that extends around the uncured polymer composite.

9. The method according to claim 1 wherein said support is a mould.

10. The method according to claim 1 wherein said support is an article having a damaged or fractured portion; and, laying an uncured thermosetting polymer composite comprises laying up at least one layer of uncured polymer composite on a damaged or fractured portion of said article;
    whereby upon curing of said composite, the article is repaired.

11. The method according to claim 10 further comprising:
    mechanically removing any loose material from a surface of the article.

12. The method according to claim 11 comprising:
    applying a gap filling compound to one or more apertures in the article.

13. The method according to claim 10 comprising:
    applying an adhesive layer to the article to produce a bond between the article and the uncured polymer composite.

14. The method according to claim 1 comprising:
    applying a non-stick release film on the uncured polymer composite.

15. The method according to claim 1 comprising:
    applying a breather layer around the uncured polymer composite.

16. The method according to claim 1, wherein the chamber is loosely sealed to the support.

17. A method of repairing an article having a damaged or fractured portion comprising:
    laying an uncured thermosetting polymer composite over a damaged or fractured portion of an article to be repaired;
    forming an airtight barrier about the uncured composite to define a region between the composite and the barrier;
    applying a vacuum to the region to conform the barrier to a shape of the damaged or fractured portion of the article;
    introducing water vapour into an open or closed chamber about the airtight barrier which chamber includes a flexible sheet arranged loosely over the airtight barrier and constituted by mutually facing surfaces of the flexible sheet and the air tight barrier; and
    whereby the polymer composite is substantially cured by condensing water vapour in said chamber directly on the airtight barrier, and heating the composite through said barrier while the flexible material remains loosely arranged during the curing step.

* * * * *